Figure 1:
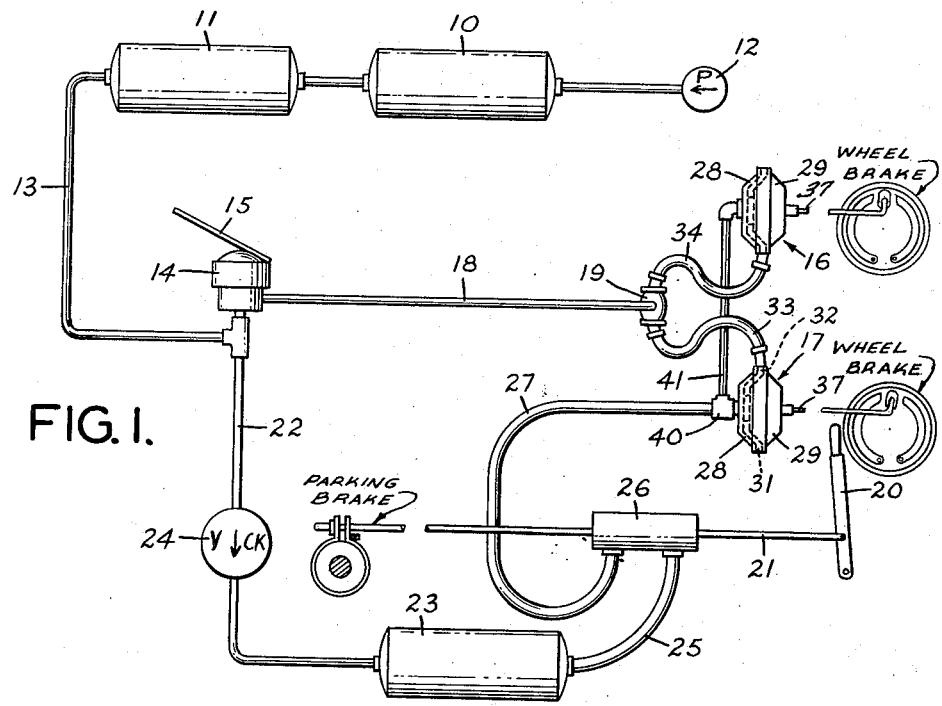

Aug. 18, 1953  
F. H. HOLMAN, JR  
2,649,169  
COMBINED POWER-ASSISTED AND MECHANICAL  
BRAKING SYSTEMS FOR VEHICLES  
Filed Nov. 7, 1947

INVENTOR.  
FRANK HOLMAN  
BY  
HIS ATTORNEYS.

Patented Aug. 18, 1953

2,649,169

UNITED STATES PATENT OFFICE 2,649,169

COMBINED POWER-ASSISTED AND MECHANICAL BRAKING SYSTEMS FOR VEHICLES

Frank H. Holman, Jr., Swarthmore, Pa., assignor to Mack Manufacturing Corporation, New York, N. Y., a corporation of Delaware Application November 7, 1947, Serial No. 784,726

8 Claims. (Cl. 188—152)

This invention relates to improvements in braking mechanisms or systems and it relates particularly to an improved form of hand brake mechanism whereby the hand brake may be used to actuate the mechanical brakes and power-actuated brakes of vehicles simultaneously.

A great majority of the heavy duty vehicles now being manufactured are equipped with power-actuated brakes, such as, pneumatic, hydraulic or vacuum actuated brakes, which are responsive to the operation of a foot pedal.

Usually, the hand, parking or emergency brake is connected to and actuates a separate mechanical braking system, such, as for example, a disc or drum type of brake on the propeller shaft of the vehicle.

It has been proposed heretofore that the hand brake lever can also be used to actuate the power brakes and the mechanical brake simultaneously in order to increase the safety and dependability of the braking system. However, previous attempts to provide power and mechanical braking by means of the hand brake have not been very successful for the reason that the prior systems have been complicated and undependable. Such systems have included many additional connections, valves and the like which render them difficult and expensive to install in vehicles. Moreover, the prior systems are disadvantageous for the reason that the fluid pressures supplied when the hand and foot brakes are operated together may add in the system and thereby overload and damage the system.

An object of the present invention is to overcome the disadvantages of the prior systems and provide dependable and safe operation of both mechanical and power brakes by means of the hand brake.

Another object of the present invention is to provide a simple mechanical and fluid actuated brake system actuated by the hand brake and having only a few more parts than are required for separate power and mechanical braking systems.

A further object of the present invention is to provide a power braking system in which pressure supplied by different sources of fluid under pressure is not added in the brake actuating motors, whereby danger of overloading the braking system is overcome.

In accordance with the present invention, a system is provided whereby the fluid pressure which is controlled by the foot brake energizes the brake actuating motors in the normal manner without interference from any pressure applied by the hand brake mechanism. On the other hand, when the vehicle operator applies the hand brake of the new system, the usual mechanical brake in such a system is actuated, and, in addition, a valve is opened which permits air from an extra reservoir to pass into the brake actuating motor to actuate the fluid operated brakes. In order to avoid overloading of the system, the brake actuating motor is provided with two flexible diaphragms providing two separate independent chambers. The diaphragms are so arranged that the air from the foot brake valve enters the space between the diaphragms and one of these diaphragms acts to operate the brake actuating plunger or rod in the usual manner. During operation of the brake system with the foot brake, the second diaphragm merely rests against the end of the motor casing and is unaffected by the pressure thereon.

The valve which is actuated by the hand brake introduces the fluid between the second or added diaphragm and the casing. Thus, when this valve is opened by actuation of the hand brake, the second diaphragm will be forced against the first diaphragm and will displace the latter, thereby operating the brake plunger.

If the operator should inadvertently or intentionally actuate the hand brake and the foot brake at the same time, the pressure will be equalized on opposite sides of the second diaphragm, and only the pressure from the foot brake valve, or the higher pressure of the two sources will act to apply the brakes. In this way, any danger of addition of the pressures and overloading and damaging of the diaphragms are entirely overcome by the new system.

In order to increase the safety of the system, it is preferable to have a separate reservoir for supplying air to the hand brake valve, so that, in the event of failure of the pressure in the foot brake system, air pressure can be applied to the power brakes by the hand brake in addition to operation of the mechanical brake or brakes of the system.

Figure 2:
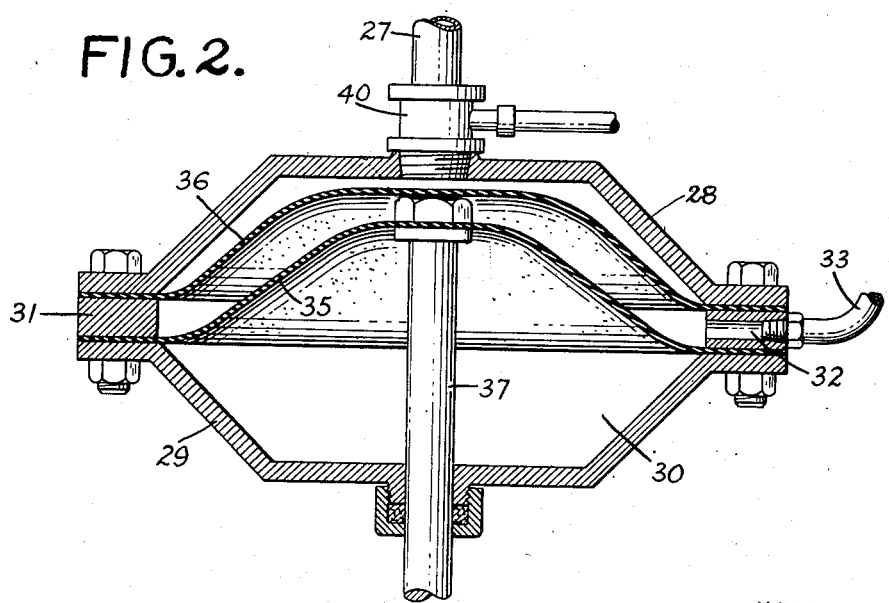

For a better understanding of the present invention, reference may be had to the accompanying drawings, in which:

Figure 1 is a diagrammatic showing of a typical system embodying the present invention with details of the mechanical brakes omitted for purposes of clarity; and Figure 2 is a view in section taken through one of the brake actuating diaphragm motors disclosing details thereof.

The present invention will be described in connection with a conventional air brake system and a conventional mechanical brake actuating system involving elements which are well-known in the art and are not described in detail herein.

It will be understood that the system is not limited to use with air brakes but can be adapted to other fluid actuated brakes, if desired.

The system illustrated may include a pair of air pressure reservoirs 10 and 11 which are supplied with compressed air by means of a suitable compressor 12. The two reservoirs 10 and 11 are connected to each other and are connected by means of a conduit 13 to a valve 14 which is actuated by means of a foot brake pedal 15 to admit air to a pair of brake actuating motors 16 and 17. The brake valve 14 is of the conventional balanced type which admits air to the brakes in proportion to the displacement of the brake pedal 15. The valve 14 is connected by means of a conduit 18 to a quick-release valve 19, also of conventional construction which includes a check valve that may be displaced to allow air to be admitted to the brake motors 16 and 17, but, upon closing of the valve 14, vents the air in the motors to atmosphere. Valves of this type are well-known and commonly used in air brake systems. Typical examples of such quick release valves are disclosed in U. S. Patents Nos. 1,412,473, dated April 11, 1922, and 2,040,580, dated May 12, 1936.

The conventional hand brake system of the vehicle usually includes a lever 20 which is connected to a brake rod 21 which in turn is connected to the mechanical brake, not shown, of the vehicle. Such a mechanical brake may be a disc-type brake attached to the propeller shaft of the vehicle or an internal-expanding or external-contracting brake cooperating with a suitable brake drum on the propeller shaft of the vehicle. Such mechanical braking systems are old and do not form a part of the present invention except in so far as the brake rod 21 is utilized to control the air brake system hereinafter described.

The hand brake controlled system includes a conduit 22 which is connected to the conduit 13 so that air may be supplied to an auxiliary reservoir 23 through a check valve 24. The check valve 24 is so arranged that if the reservoirs 10 and 11 should leak or lose pressure, the check valve will close, maintaining the reservoir 23 at line pressure. This reservoir is connected by means of a conduit 25 to a valve 26 of conventional type which is arranged to open when the hand brake is operated and to close when the hand brake 20 is released. The discharge port of the valve 26 is connected to a conduit 27 which is connected to the two brake actuating motors 16 and 17 in a manner described hereinafter. The valve 26 vents the conduit 27 to atmosphere when the hand brake 20 is released.

Referring now to Figure 2, each brake actuating motor 16 and 17 includes a pair of casing sections 28 and 29. These casing sections 28 and 29 may be of generally dish-like shape. A spacer ring 31 is connected between the flanges of the casing sections 28 and 29, the ring of the cylinder 17 being provided with an inlet port 32 which is connected by means of the conduit 33 to the quick-release valve 19. The motor 16 is like the cylinder 17 and the port in its spacer ring is connected by means of a conduit 34 to the quick-release valve 19.

A novel feature of the motors 16 and 17 is the provision of the usual diaphragm 35 and an additional diaphragm 36 therein which divide the motor into separate sealed compartments or chambers. The diaphragm 35 is mounted between the ring 31 and the casing section 29 and is connected to the brake rod 37 in the usual way.

The diaphragm 36 is mounted between the chamber section 28 and the ring 31 and is disposed loosely in the chamber so that it can flex independently of the diaphragm 35. A function of the diaphragm 36 is to segregate the air supplied from the reservoirs 10 and 11 from the air supplied from the reservoir 23 so that air from the reservoir 23 cannot escape through quick-release valve 19, and air from the reservoirs 10 and 11 cannot escape from the valve 26 when these valves are open to vent air to the atmosphere.

The conduit 27 from the hand brake valve 26 is connected by means of a T coupling 40 to the interior of the motor 17 through the chamber section 28. A take-off conduit 41 also extends from the T coupling 40 to the end of the motor 16 behind the diaphragm 36.

When air is supplied from the foot brake valve 14 to the motors 16 and 17, the air is introduced between the diaphragms 35 and 36 of the two motors. As a result, the diaphragm 36 is forced tightly against the section 28 and the diaphragm 35 is forced in the opposite direction, thereby projecting the brake rod 37 to actuate the brakes of the vehicle. It will be understood that the same action takes place in both of the motors 16 and 17.

When the air is released through the quick-release valve 19, the brake rods 37 will be retracted and the brakes released.

When the hand brake 20 is applied, the movement of the hand brake lever will apply the mechanical brakes and at the same time will open the valve 26. Air is supplied thereby from the reservoir 23 through the valve 26 into each of the motors 16 and 17, forcing the diaphragm 36 against the diaphragm 35 and forcing them both in a direction to project the brake rod 37 to apply the brakes. When the hand brake 20 is released, air is vented to atmosphere through the valve 26 and the brakes are released.

If both the hand brake 20 and the foot brake 15 are applied simultaneously, air is applied between the diaphragms 35 and 36 and behind the diaphragm 36. If the air pressure in the reservoirs 10 and 11 is the same as the air pressure in the reservoir 23, the air pressures on opposite sides of the diaphragm 36 are equalized, thereby leaving this diaphragm in a static condition but applying the pressure to the diaphragm 35 to cause appliction of the air brakes.

If the air pressure in the reservoir 23 exceeds the pressure in the reservoirs 10 and 11, this pressure will predominate and both of the diaphragms 35 and 36 will be displaced to project the brake rod 37.

If the pressure in the reservoirs 10 and 11 is greater than the pressure in the reservoir 23, the diaphragm 36 will be forced against the casing section 28 and the brakes will be applied by the air pressure between the diaphragms 35 and 36. Therefore, whenever air pressure is available in one of the reservoirs, it is possible to apply the power brakes of the vehicle. Moreover, even if the sum of the pressures would be high enough to damage the brake mechanism, such damaging action does not occur because of the neutralizing or equalizing effect of the pressures on opposite sides of the diaphragm 36.

From the preceding description, it will be apparent that a power assisted hand brake system has been provided whereby positive application of fluid pressure is assured so long as pressure is available in the auxiliary reservoir, thereby materially increasing the safety of the system. Moreover, the system has the advantage of being compact and simple, and, therefore, difficulties of installation and in servicing are overcome to a major degree.

It will be understood that the system is susceptible to considerable modification, for example, the auxiliary reservoir 23 may be supplied by pressure from a source independent of the compressor 12. The size, shape and arrangement of the motors can be modified depending upon the type of vehicle in which the system is applied. The connections between the valves 14 and 26 and the motors can be reversed, that is, the valve 26 can be connected to the chamber between the diaphragms 35 and 36 and the valve 14 can be connected to the chamber behind the diaphragm 36. Any desired type of mechanical brakes can be used in conjunction with the fluid operating system described above. Moreover, the control valves of the system may be modified in accordance with existing practices and equivalent types of valves may be used therein. Therefore, the form of the invention described herein should be considered as illustrative and not as limiting the scope of the following claims.

I claim:

1. A vehicle brake system comprising fluid-actuated brakes having a brake actuating motor, a foot-actuated member for supplying fluid to said motor to actuate said brakes, a hand brake member, a mechanical brake connected to said member for actuation thereby, a valve actuated by said hand brake member for supplying fluid to said motor to actuate said fluid-actuated brakes, and means in said motor for segregating the fluid supplied by one of said valves from the fluid supplied by the other valve.

2. A vehicle brake system comprising at least one brake-actuating motor having first and second flexible diaphragms therein, a brake rod connected to said first diaphragm and displaceable axially therewith, a first valve for supplying fluid under pressure to said motor between said diaphragms to flex said diaphragms in opposite directions and displace said brake rod axially, a second valve for supplying fluid under pressure to said motor on the opposite side of the second diaphragm from said first diaphragm to flex said diaphragms in the same direction to displace said brake rod.

3. A vehicle brake system comprising a brake actuating motor having first and second flexible diaphragms therein, said diaphragms dividing said cylinder into a plurality of sealed compartments, a brake actuating rod connected to said first diaphragm and movable relatively to said motor as said first diaphragm flexes, a source of fluid pressure, means connecting said source to one of said compartments between said diaphragms, a foot-actuated valve for controlling the supply of fluid pressure to said one of said compartments, another source of fluid pressure, means connecting said another source to another of said compartments on the opposite side of said second diaphragm from said one compartment, and a hand-actuated valve for controlling the supply of fluid pressure to said another compartment.

4. A brake system for vehicles comprising a brake actuating motor having first and second flexible diaphragms therein dividing said motor into a plurality of sealed compartments, a brake actuating rod connected to said first flexible diaphragm and movable lengthwise as said first diaphragm flexes, a source of fluid under pressure, a foot brake member, a first valve responsive to movement of said foot brake member, means, including said first valve connecting said source to said motor for introducing fluid into one of said compartments for flexing said diaphragms to cause lengthwise movement of said brake actuating rod, a hand brake member, means connected with said hand brake member for actuating a mechanical brake, a second valve responsive to movement of said hand brake member, and means including said second valve for connecting said source to said motor for supplying fluid under pressure to another of said compartments to flex said diaphragms and move said brake actuating rod lengthwise.

5. A brake actuating motor comprising a hollow member, a pair of diaphragms extending across said hollow member and dividing it into a plurality of expansible and contractable chambers, a brake rod connected to one of said diaphragms and projecting from said hollow member for axial movement relative thereto, means forming a port in said hollow member communicating with the chamber between said diaphragms, and means forming another port in said hollow member communicating with a chamber on the opposite side of the diaphragm to which the brake rod is not connected from said one diaphragm.

6. A brake actuating motor comprising a pair of dish-shaped members having opposed radially extending peripheral flanges, a spacer ring between said flanges having a port extending substantially radially therethrough, means connecting said dish-shaped members to said ring to form a hollow casing, separate flexible diaphragms having edge portions interposed between said flanges and said spacer ring on opposite sides of the latter dividing said hollow casing into three separate expansible chambers sealed from each other, a brake actuating member connected to about the mid-portion of one of said diaphragms and extending slidably through the dish-shaped member adjacent thereto, and a port in the other dish-shaped member.

7. A vehicle brake system comprising at least one fluid-actuated brake motor including a casing, a first brake connected with and operable by said motor, a first member connected to said brake and displaceable in said casing for actuating said brake, a second member displaceable in said casing and movable relative to said first member into engagement therewith to apply said first brake and out of engagement with said first member, said members dividing said casing into a first compartment between said members and a second compartment between said casing and said second member, said compartments being segregated from each other, a first valve for supplying fluid under pressure to said first compartment to displace said first and second members in opposite directions to actuate said brake, a pedal for actuating said first valve, a second valve for supplying fluid under pressure to said second compartment to urge said second member against said first member and displace both members in the same direction in said casing to actuate said brake, a parking brake, a hand operated member connected to said parking brake for applying and releasing it, and means connecting said hand operated member to said second valve to actuate the latter to supply fluid to apply said fluid-actuated brake when the hand operated member is moved to apply said parking brake.

8. A vehicle brake system comprising a fluid-actuated motor for a fluid-actuated brake, a first reservoir for fluid under pressure, a second reservoir for fluid under pressure, means for supplying fluid under pressure to said reservoirs, a check valve interposed between said reservoirs preventing loss of pressure from one of said reservoirs if the pressure in the other reservoir decreases, a conduit connecting said other reservoir to said motor, a brake pedal, a first control valve actuated by said pedal and interposed in said conduit for connecting said other reservoir and said motor to apply said fluid-actuated brake and disconnecting said other reservoir and said motor, a pressure-responsive release valve interposed in said conduit between said foot-actuated valve and said motor for releasing fluid pressure from said motor when said other reservoir is disconnected from said motor, a second conduit connecting said one reservoir to said motor, a mechanical parking brake, a hand operated member mechanically connected to said parking brake for applying and releasing said parking brake, a second control valve connected to and actuated by said hand operated member and interposed in said second conduit for connecting said reservoir to said motor to apply said fluid-actuated brake and disconnecting said reservoir from said motor and venting the latter to release said fluid-actuated brake, and means in said motor for segregating the fluid supplied to the motor by one reservoir from the fluid supplied to the motor by the other reservoir.

FRANK H. HOLMAN, Jr.

References Cited in the file of this patent

UNITED STATES PATENTS

| Number | Name | Date |
|---|---|---|
| 1,291,765 | Christensen | Jan. 21, 1919 |
| 1,299,748 | McClosky | Apr. 8, 1919 |
| 1,848,458 | Bragg et al. | Mar. 8, 1932 |
| 1,917,671 | Stahl | July 11, 1933 |
| 2,040,580 | Vorech | May 12, 1936 |
| 2,195,558 | Bowen | Apr. 2, 1940 |
| 2,212,913 | Breese | Aug. 27, 1940 |
| 2,379,291 | Glass | June 26, 1945 |
| 2,416,222 | Rodway | Feb. 18, 1947 |
| 2,578,338 | Ambler | Dec. 11, 1951 |

FOREIGN PATENTS

| Number | Country | Date |
|---|---|---|
| 649,361 | Germany | Aug. 21, 1937 |
| 695,944 | Germany | Sept. 6, 1940 |
| 325,912 | Great Britain | Mar. 6, 1930 |
| 313,967 | Italy | Jan. 12, 1934 |
| 222,413 | Switzerland | Oct. 1, 1942 |